United States Patent
Mueller et al.

(10) Patent No.: US 8,043,183 B2
(45) Date of Patent: Oct. 25, 2011

(54) DRIVE AND HYDROSTATIC PISTON ENGINE WITH BRAKE ENERGY RECOVERY

(75) Inventors: Matthias Mueller, Neusaess (DE); Steffen Mutschler, Ulm (DE)

(73) Assignee: Bosch Rexroth AG, Stuttgart (DE)

( * ) Notice: Subject to any disclaimer, the term of this patent is extended or adjusted under 35 U.S.C. 154(b) by 735 days.

(21) Appl. No.: 12/158,157

(22) PCT Filed: Dec. 20, 2006

(86) PCT No.: PCT/EP2006/012353
§ 371 (c)(1), (2), (4) Date: Jun. 19, 2008

(87) PCT Pub. No.: WO2007/071414
PCT Pub. Date: Jun. 28, 2007

(65) Prior Publication Data
US 2010/0269496 A1    Oct. 28, 2010

(30) Foreign Application Priority Data
Dec. 20, 2005   (DE) .......................... 10 2005 060 990

(51) Int. Cl.
*F16H 47/04* (2006.01)
(52) U.S. Cl. ........................................................ 475/83
(58) Field of Classification Search ............... 475/83; 74/661, 730.1; 180/307
See application file for complete search history.

(56) References Cited

U.S. PATENT DOCUMENTS

| | | | | |
|---|---|---|---|---|
| 4,098,144 A * | 7/1978 | Besel et al. | ....................... | 74/661 |
| 4,275,616 A * | 6/1981 | Ehrlinger et al. | ............... | 475/83 |
| 4,441,573 A | 4/1984 | Carman et al. | | |
| 4,813,510 A * | 3/1989 | Lexen | ........................... | 180/165 |
| 4,986,383 A * | 1/1991 | Evans | ........................... | 180/165 |
| 5,397,281 A * | 3/1995 | Forster | ............................. | 475/83 |
| 5,542,307 A * | 8/1996 | Hasegawa et al. | ........... | 74/15.63 |
| 6,135,259 A * | 10/2000 | Forster | ........................ | 192/221.1 |
| 6,447,420 B1 * | 9/2002 | Tanabe et al. | .................... | 475/83 |
| 6,719,080 B1 * | 4/2004 | Gray, Jr. | ........................... | 180/165 |
| 6,884,195 B2 * | 4/2005 | Thoma et al. | ................... | 475/83 |
| 6,971,232 B2 * | 12/2005 | Singh | .............................. | 60/414 |
| 7,076,946 B2 * | 7/2006 | Swartzer et al. | ................. | 60/414 |
| 7,137,315 B2 * | 11/2006 | Chang et al. | .................. | 74/730.1 |
| 7,273,122 B2 * | 9/2007 | Rose | .............................. | 180/165 |
| 7,487,635 B2 * | 2/2009 | Iida | .................................. | 60/487 |
| 7,537,075 B2 * | 5/2009 | Gray et al. | ..................... | 180/165 |
| 7,856,816 B2 * | 12/2010 | Duray | .............................. | 60/414 |
| 2004/0251067 A1 | 12/2004 | Gray, Jr. et al. | | |

FOREIGN PATENT DOCUMENTS

| | | |
|---|---|---|
| AT | 395 960 B | 4/1993 |
| DE | 42 19 514 A1 | 12/1993 |
| DE | 10 2004 043 897 | 9/2005 |
| EP | 0 253 975 A1 | 1/1988 |

\* cited by examiner

*Primary Examiner* — Dirk Wright
(74) *Attorney, Agent, or Firm* — Scully, Scott, Murphy & Presser, P.C.

(57) ABSTRACT

The invention relates to a hydrostatic piston engine (11) and a drive (1) for recovering brake energy. The drive comprises a driving shaft (4) and a first accumulator (12) for accumulating pressure energy. The first accumulator (12) is connected to a hydrostatic piston engine (11). Said hydrostatic piston engine (11) has a coupling (9) and can be connected to the driving shaft (4) by means of the coupling (9). The hydrostatic piston engine (11) comprises a housing in which a cylinder drum and the driving shaft (4) are rotatably received. The cylinder drum can be connected to the driving shaft (4) by means of the coupling (9) in a rotationally fixed manner.

39 Claims, 3 Drawing Sheets

DRIVE AND HYDROSTATIC PISTON ENGINE WITH BRAKE ENERGY RECOVERY

The invention relates to a drive with brake energy recovery having a hydrostatic piston engine, and a hydrostatic piston engine of this type.

With drives of vehicles or operating equipment, it is known, using hydrostatic piston engines, to store and subsequently recover brake energy. For instance, in particular with hydrostatic travel drives, it is known to drive a hydrostatic gear by means of an internal combustion engine. In a braking operation of a vehicle of this type, the hydrostatic piston engine which is operated as a motor acts as a pump and conveys a pressure medium into a store which is provided for this purpose. In this manner, pressure energy is stored in the store. This pressure energy can subsequently be recovered by the pressure medium which flows from the store at high pressure being returned again to the hydraulic motor at the inlet side.

A travel drive of this type having an adjustable hydraulic motor, a high-pressure store and a low-pressure store is known from AT 395 960 B. The travel drive which is proposed therein comprises an adjustable hydraulic motor, which can be redirected from a neutral position in a first direction and an opposing second direction. During a normal forward travel operation, the hydraulic motor is redirected in a first direction. The hydraulic motor is acted on at the inlet side with a pressure medium supplied by a hydraulic pump. When the desired travel speed is reached, the pivot angle of the hydraulic motor is decreased and preferably reduced to zero so that the vehicle moves freely. In order to brake the vehicle, the energy which is released during the braking operation is stored. To this end, the hydraulic motor is redirected counter to the previous direction thereof during travel operation. The hydraulic motor thereby pumps the pressure medium in the opposite direction and conveys the pressure medium into the high-pressure store. The pressure medium required to convey pressure medium into the high-pressure store is taken from the low-pressure store. During a subsequent acceleration operation, the conveying direction is reversed again. To this end, the hydraulic motor is tilted out, counter to the redirection direction during the braking operation, to a delivery volume corresponding to the acceleration. With the drive device known from AT 395 960 B, the high-pressure side always remains the same with respect to the connection side of the hydraulic motor.

The drive described has the disadvantage that the storage and the use of the brake energy requires considerable adjustment complexity owing to the changing round of the hydraulic motor. Adjustment complexity of this type is brought about, first and foremost, since a hydraulic motor which is generally provided to drive the vehicle must at the same time store and recover the kinetic energy and drive the vehicle.

The object of the invention is to provide a drive and a suitable axial piston engine in which the function of energy storage and recovery can be switched off.

The object is achieved with the hydrostatic piston engine according to claim 1 and the drive according to claim 11.

The hydrostatic piston engine unit according to claim 1 comprises a housing, in which a cylinder drum and a drive shaft are rotatably supported. The cylinder drum can be connected to the drive shaft in a rotationally secure manner by means of a coupling. The possibility of connecting the cylinder drum to the drive shaft in a rotationally secure manner by means of a coupling has the advantage that there is no permanent connection between the cylinder drum and the drive shaft. The drive shaft can therefore be constructed as part of the drive train, the remaining components of the hydrostatic piston engine unit for storing and recovering the energy being caused to rotate only when a storage operation or recovery operation is actually required. During the remaining operation of the drive, however, the cylinder drum can remain uncoupled and the rotating masses are significantly reduced. This ensures better response characteristics of the drive since a rotation pulse modification of the hydrostatic piston engine unit is not required.

The drive according to the invention comprises a drive shaft and at least a first store for storing pressure energy. In order to be able to store pressure energy in the store, the first store is connected to a hydrostatic piston engine unit. The hydrostatic piston engine unit has a coupling and can be connected to the drive shaft of the drive by means of the coupling. As already explained with regard to the hydrostatic piston engine unit, it is thereby possible to make provision for the hydrostatic piston engine unit to be coupled in if it is necessary to store pressure energy in the first store. For normal travel operation, in which there is no provision for brake energy to be stored, nor for brake energy to be recovered, the connection is disengaged and the hydrostatic piston engine unit is idle. Consequently, acceleration and braking of the hydrostatic piston engine unit is not required during normal travel operation. As in the explanation of the hydrostatic piston engine unit, the reduction of the rotating masses is also particularly advantageous in this instance.

The subsidiary claims relate to advantageous developments of the hydrostatic piston engine unit according to the invention and the drive according to the invention.

In particular, it is advantageous to arrange the coupling for connecting the cylinder drums to the drive shaft in the housing of the hydrostatic piston engine unit. A compact assembly is thereby achieved which has a reduced structural length compared with a separate arrangement of the coupling and hydrostatic piston engine unit. Furthermore, it is advantageous to connect the coupling to the cylinder drum by means of a gear stage. It is consequently possible to adapt the speed of the drive shaft which can be connected to the cylinder drum to the ideal efficiency range of the hydrostatic piston engine unit. In order to produce an assembly which is as compact as possible, it is particularly advantageous to construct the gear stage in the form of a planetary gear. The axial structural length of a planetary gear of this type is small compared with other gear arrangements.

Optimum use of the available structural space is also achieved if the internal gear wheel of the planetary gear is securely connected to, preferably integrated with, the housing of the piston engine unit. Ideally, the internal gear wheel and the housing of the piston engine are constructed integrally. Owing to the connection and arrangement of the internal gear wheel of the planetary gear, the radial extent of the hydrostatic piston engine can be minimised.

It is particularly advantageous to connect the cylinder drum to the web or to the sun wheel of the planetary gear to produce the desired step-up or step-down operation. A connection of this type between the cylinder drum and the web or sun wheel of the planetary gear also has the advantage of making effective use of the structural space available. With regard to the use of the structural space, it is further advantageous to support the cylinder drum rotatably on the drive shaft. Owing to such a concentric arrangement of the drive shaft and the cylinder drum, it is not necessary to provide a separate bearing arrangement for the cylinder drum. If, as set out as being advantageous above, the cylinder drum is connected to the sun wheel of the planetary gear, it is also possible, for example, to arrange a second bearing location in the region of the sun wheel. In the region of the cylinder drum facing away therefrom, an additional bearing on the drive shaft is consequently sufficient.

According to the preferred embodiment thereof, the coupling is constructed as a plate coupling. Plate couplings of this type, when arranged inside the housing of the hydrostatic piston engine unit, have the advantage that they are in any case constructed as couplings which run in an oil bath. A plate coupling of this type has the advantage that a separate coupling housing can be dispensed with. The lubrication of all the coupling components involved is carried out by means of the pressure medium located in a tank space which is arranged inside the housing of the hydrostatic piston engine unit.

In particular together with a cylinder drum which is connected to the sun wheel, an advantageous compact arrangement is obtained if the coupling cage of the plate coupling is connected to the drive shaft in a rotationally secure manner. The carrier side of the coupling that is smaller in terms of radial extent is then associated with the hydrostatic piston engine unit. Owing to the rotationally secure connection of the coupling cage to the drive shaft, only the carrier having a smaller diameter has to be rotatably supported on the drive shaft by means of bearings. Smaller bearings at the same time result in lower costs.

According to another advantageous configuration, the drive shaft of the hydrostatic piston engine is constructed as a through-shaft. When a continuous drive shaft of this type is used, a flange can be provided at both sides of the hydrostatic piston engine unit so that the hydrostatic piston engine unit can be integrated in a simple manner in a drive train. The hydrostatic piston engine unit consequently acts as a drive shaft of the drive train which can thereby be constructed with no offset portion.

Furthermore, it is advantageous to provide a second store in the drive in addition to the first store. The two stores are connected to each other by means of the hydrostatic piston engine unit. The two stores together form a hydraulic cradle, the hydrostatic piston engine unit in each case conveying pressure medium removed from one store into the other store. In the event of a braking operation, pressure medium is drawn from the second store by the hydrostatic piston engine unit and conveyed into the first store with the pressure being increased. Conversely, during an acceleration phase, pressure medium is removed from the first store which is constructed as a high-pressure store and depressurised in the second store by means of the hydrostatic piston engine unit. The hydrostatic piston engine unit thus acts as a hydraulic motor and transfers torque to the drive shaft via the closed coupling.

With the hydrostatic drive, it is further advantageous to construct the at least one first store so as to be able to be separated from the hydrostatic piston engine unit by means of a blocking device. Owing to such a means for separation, it is also not possible for pressure medium to escape from the pressure store when the hydrostatic piston engine unit has a fixed stroke volume in a simple configuration. With a blocking means of this type, the pressure energy stored in the first store is maintained and it is possible to use the stored energy at a later point in time.

A preferred configuration of the drive and the hydrostatic piston engine unit are illustrated in the drawings and explained in greater detail in the description below.

Figure 1:
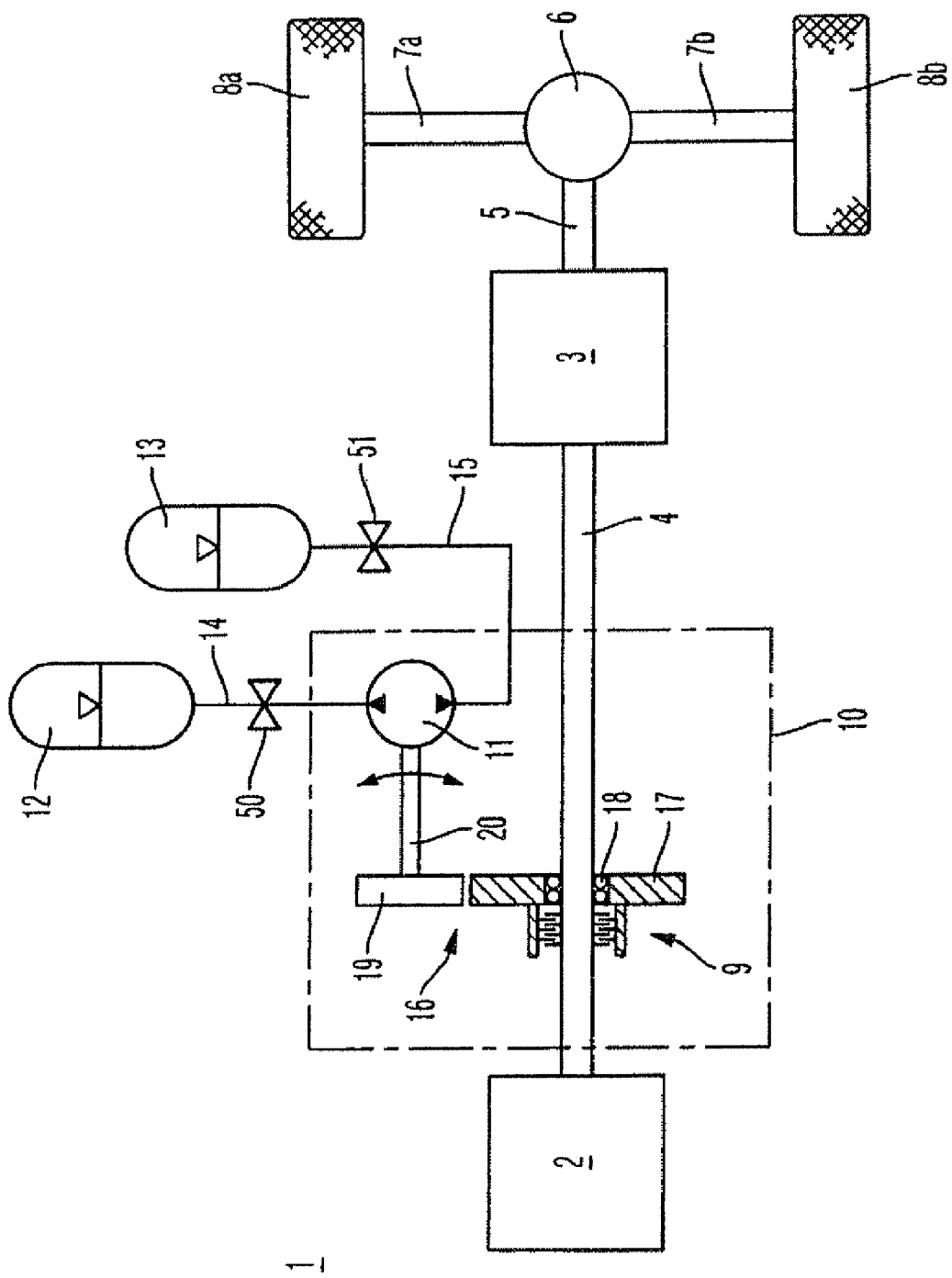
FIG. 1 is a schematic illustration of a drive according to the invention.

FIG. 1 is a highly simplified illustration of a drive 1 according to the invention. The drive 1 according to the invention has a drive motor 2. The drive motor 2 may be, for example, a diesel combustion engine in a construction site vehicle. In the embodiment illustrated, the drive 1 is a travel drive for a construction machine of this type.

Using the drive motor 2, a vehicle gear 3 is driven by means of a drive shaft 4. The vehicle gear 3 may have, for example, a hydrostatic gear. A hydrostatic gear of this type comprises a hydraulic pump which is connected to the drive shaft 4 and a hydraulic motor which is connected thereto in a closed circuit. The drive torque produced by the hydraulic motor is transferred to a differential gear 6 by means of a differential input shaft 5. The differential gear 6 is connected to the two driven wheels 8a, 8b by means of a first half shaft 7a and a second half shaft 7b, respectively.

The present drive 1 is constructed as a travel drive purely by way of example. Other drive trains are also conceivable in mobile and stationary applications in which drive and braking torques are transferred by means of rotating shafts.

In the illustrated embodiment, the drive shaft 4 is constructed as a through-shaft through a hydrostatic piston engine unit 10. In order to drive the hydrostatic piston engine 11, a coupling 9 is provided by means of which the piston engine 11 can be connected to the drive shaft 4. The actual drive mechanism of the hydrostatic piston engine unit 10 is referred to as a piston engine 11.

In order to store energy, a first store 12 and a second store 13 are connected to the hydrostatic piston engine 11. The first store 12 is connected to a connection of the hydrostatic piston engine 11 by means of a first store line 14. Accordingly, the second store 13 is connected to a second connection of the hydrostatic piston engine 11 by means of a second store line 15. The hydrostatic piston engine 11 can be operated both as a pump and as a motor. In the event of storing brake energy, the hydrostatic piston engine 11 is caused to rotate owing to the mass inertia of the driven vehicle and pumps pressure medium from the second store 13 into the first store 12. A compressible volume provided in the first store 12 is compressed and consequently the brake energy is stored in the first store 12 in the form of pressure energy.

Both stores 12, 13 or at least the first store 12 can preferably be separated from the hydrostatic piston engine 11 by means of a blocking device. In the embodiment illustrated, the blocking device comprises the two valves 50, 51. The blocking of the first store 12 allows the reduction of losses if removal of pressure medium is not required over a relatively long period of time.

In order to be able to operate the hydrostatic piston engine 11 in the optimum speed range thereof, a gear stage 16 is provided which is arranged in the force path direction between the coupling 9 and the hydrostatic piston engine 11. The gear stage 16 comprises a first toothed wheel 17 and a second toothed wheel 19 which are in permanent engagement. The first toothed wheel 17 is rotatably supported on the drive shaft 4 by means of a bearing 18. As long as a force path is not produced by means of the coupling 9, the drive shaft 4 can rotate independently of the first toothed wheel 17. The storage device for storing brake energy is separated from the vehicle drive in a travel state of this type. In order to store brake energy during an overrun, the coupling 9 is closed and the first toothed wheel 17, owing to a rotationally secure connection by means of the coupling 9, is brought to the same speed as the drive shaft 4. Accordingly, the second toothed wheel 19 is also caused to rotate and transfers this rotational movement to the hydrostatic piston engine 11 by means of a connection shaft 20. In the embodiment illustrated, the hydrostatic piston engine 11 rotates at a higher speed than the drive shaft 4. By selecting the transmission ratio of the gear stage 16, it is consequently possible to adapt the speed of the drive shaft 4 to the ideal speed of the hydrostatic piston engine 11 in terms of efficiency.

In the illustrated embodiment of FIG. 1, the drive shaft 4, to which the hydrostatic piston engine unit 10 can be connected by means of the coupling 9, is arranged as a connection shaft between the drive motor 2 and a vehicle gear 3. However, the hydrostatic piston engine unit 10 can also equally advantageously be arranged in the region of the differential input shaft 5 or in another position downstream of the vehicle gear 3. This has the advantage that the vehicle gear 3, when storing released kinetic energy, is not arranged between the differential gear 6 and the hydrostatic piston engine unit 10. Mechanical losses which occur, for example, with a switching gear as a vehicle gear 3, consequently do not have a negative influence on the recovery of the released kinetic energy or the storage in the form of pressure energy.

Figure 2:
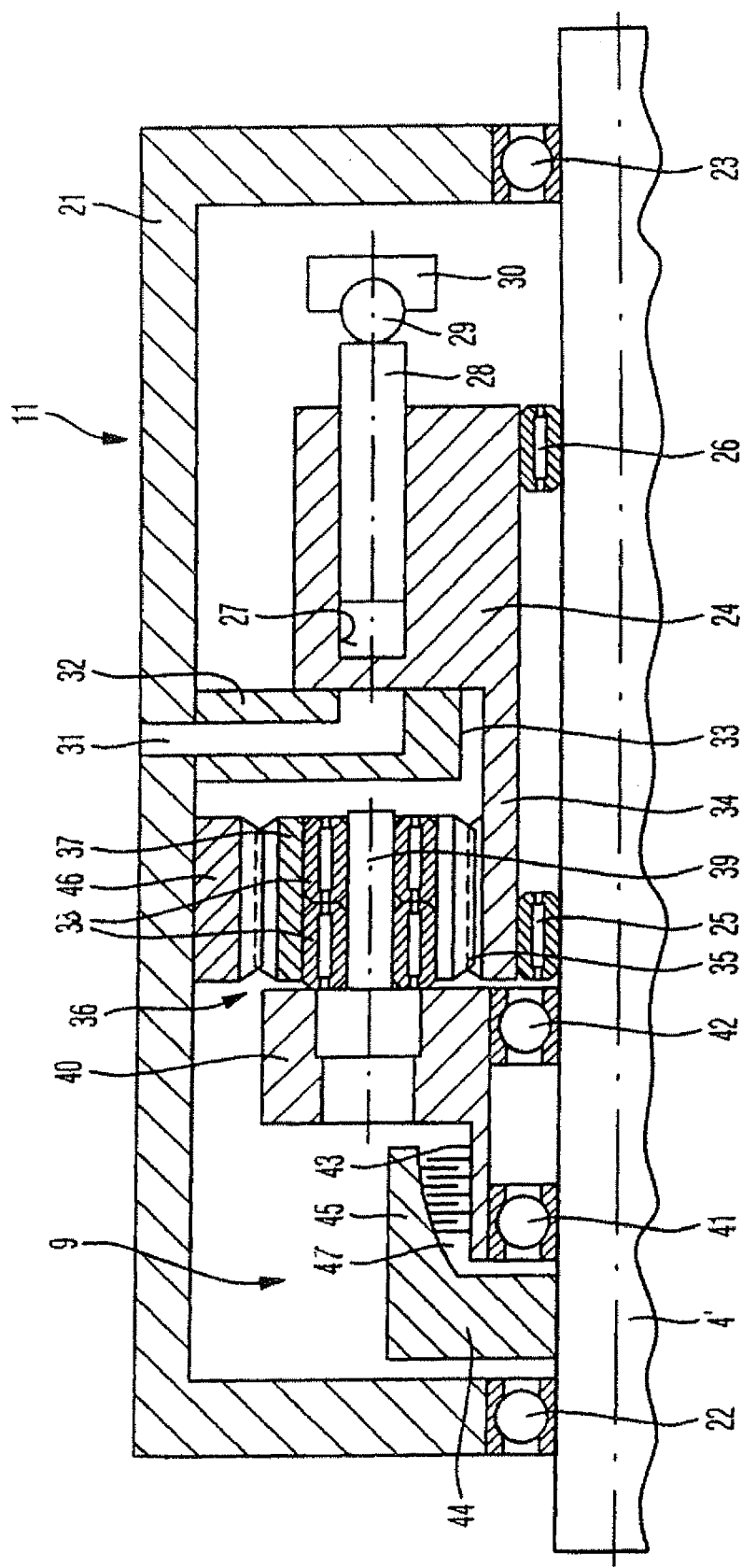
FIG. 2 is a schematic illustration of a first hydrostatic piston engine according to the invention.

A structural embodiment of a hydrostatic piston engine unit 10 is illustrated in FIG. 2. The hydrostatic piston engine unit 10 comprises the hydrostatic piston engine 11 which is arranged in a housing 21. A first drive shaft bearing 22 and a second drive shaft bearing 23 are arranged in the housing 21. The drive shaft 4' is rotatably supported in the first and second drive shaft bearing 22, 23. The hydrostatic piston engine 11 comprises a cylinder drum 24 which is also rotatably supported on the drive shaft 4'. To this end, a first cylinder drum bearing 25 and a second cylinder drum bearing 26 are provided. In the embodiment illustrated, the first and the second cylinder drum bearings 25, 26 are constructed as needle bearings.

In the cylinder drum 24, a plurality of cylindrical holes 27 are arranged. In the cylindrical holes 27, pistons 28 are arranged so as to be able to be longitudinally displaced and are supported by means of an articulated connection 29 and a sliding member 30 in an axial direction on an inclined disc which is not illustrated. During a rotation of the cylinder drum 24, the pistons 28 therefore carry out a stroke movement in the cylindrical holes 27. The cylindrical holes 27 have cylindrical openings which are not illustrated in FIG. 2 and by means of which the cylindrical holes 27 can be alternately connected during a revolution of the cylinder drum 24 to a first connection 31 or a second connection which is not illustrated in FIG. 2. The connection 31 and the second connection which is not illustrated are the high-pressure and low-pressure connection of the hydrostatic piston engine 11. The illustrated first connection 31 is provided in a control plate 32 which is only schematically indicated.

The control plate 32 has a central through-opening 33. An extended portion 34 of the cylinder drum 24 extends through the central through-opening 33. The axial extent of the extended portion 34 is greater than the thickness of the control plate 32. At an outer periphery of the extended portion 34 which is formed in a substantially cylindrical manner, a tooth structure 35 is formed. The tooth structure 35 forms a sun wheel of a planetary gear 36 and can also be produced by means of a toothed wheel which is fixed to the extended portion 34.

The first cylinder drum bearing 25 is preferably arranged in the region of the extended portion 34 in which the tooth arrangement 35 is arranged. However, the second cylinder drum bearing 26 is preferably arranged at the opposite end of the cylinder drum 24.

A plurality of planet wheels 37 are in engagement with the tooth arrangement 35. The planet wheels 37 are each rotatably arranged on a shaft 39 by means of a plurality of sun wheel bearings 38. The shafts 39 are fixed in a web 40 which is also rotatably supported on the drive shaft 4' by means of a first web bearing 41 and a second web bearing 42. The web 40 has an axial extension 43 which substantially corresponds, in terms of the radial extent thereof, to the radial extent of the extended portion 34.

A coupling cage 44 is connected to the drive shaft 4' in a rotationally secure manner. The coupling cage 44 is constructed in a substantially pot-like manner and extends over the extension 43 of the web 40 with a region 45 which is formed substantially in the manner of a hollow cylinder. In an intermediate space 47 formed between the extension 43 of the web 40 and the region 45 of the coupling cage 44, a plurality of coupling plates and coupling linings are alternately arranged.

The coupling plates have a radially inwardly directed arrangement of teeth which engage in corresponding recesses of the extension 43 of the web 40 which are not illustrated in FIG. 2. In this manner, the coupling plates are permanently connected to the extension 43 and consequently the web 40 in a rotationally secure manner. A coupling lining is arranged in each case between two adjacent coupling plates and has a tooth arrangement which is directed radially outwards and which engages in corresponding recesses of the region 45 of the coupling cage 44. Owing to the coupling plates and coupling linings being pressed together in an axial direction by means of a coupling activation means which is not illustrated, a rotationally secure connection is consequently produced between the coupling cage 44 and the web 40.

FIG. 2 illustrates a simple embodiment in which a single-stage planetary gear is provided. As long as sufficient structural space is available, it is also possible to provide a multi-stage planetary gear.

In place of the illustrated connection of the web with respect to the coupling and the sun wheel to the cylinder drum 24, it is also possible to connect the web 40 to the cylinder drum 24 and conversely to arrange the sun wheel at the coupling side. Regardless of this, the internal gear wheel 46 is securely connected to the housing 21. In particular, it is possible to form the internal gear wheel 46 as an integral part of the housing 21 and consequently make particularly good use of the available structural space.

Figure 3:
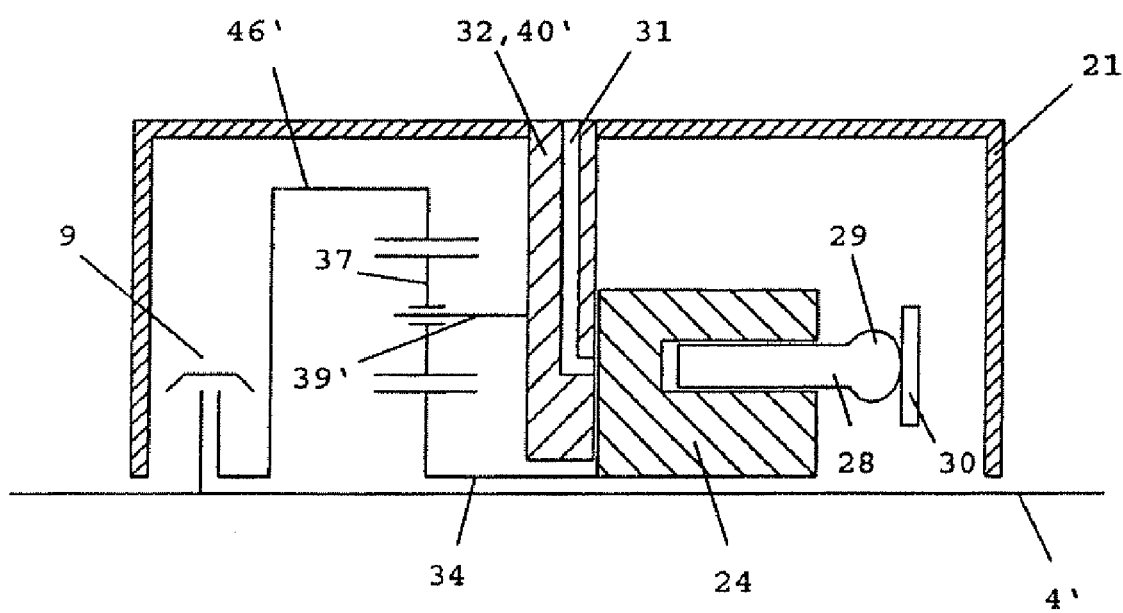
FIG. 3 is a schematic illustration of a second hydrostatic piston engine unit according to the invention.

In FIG. 3, a second embodiment of a piston engine unit according to the invention is illustrated. In contrast to the embodiment of FIG. 2, in the embodiment of FIG. 3, the shafts 39' are securely connected to the control plate 32 which is also referred to as a connection plate. Consequently, the control plate 32 forms the web of the planetary operation of the second embodiment. The housing 21, the control plate 32 and the shafts 39' consequently form a unit of the piston engine unit of FIG. 3. The corresponding elements of the embodiment of FIG. 3 have been given the same reference numerals or corresponding reference numerals with the addition of a prime mark. In order to prevent unnecessary repetition, reference is made to the function of corresponding structural elements, as already explained with reference to FIG. 2.

The cylinder drum 24 is in turn connected to the sun wheel of the planetary operation by means of the extended portion 24 thereof. The sun wheel is in engagement with the planet wheels 34 which are rotatably arranged on the shafts 39. In contrast to the embodiment of FIG. 2, the internal gear wheel 46' is now no longer securely connected to the housing 21 of the piston engine unit. Instead, the internal gear wheel 26' is now itself rotatably supported on the drive shaft 4'. In order to produce a rotationally secure connection between the cylinder drum 24 and the drive shaft 4', that is to say, a connection in which a free rotation of the cylinder drum 24 relative to the drive shaft 4' is possible, the internal gear wheel 46' is securely connected to the drive shaft 4' by closing the coupling 9. Owing to the arrangement of the embodiments according to FIGS. 2 and 3, different transmissions can therefore be produced. It is significant in both cases that, in the uncoupled state, the cylinder drum 24 can rotate freely relative to the drive shaft 4'. However, if the coupling 9 is engaged and a connection between the cylinder drum 24 and the drive shaft 4' in accordance with the transmission ratio of the planetary gear is consequently produced, the drive shaft 4' acts as a drive shaft or driven shaft for the hydrostatic piston engine unit.

The invention is not limited to the embodiment illustrated. Instead, combinations of individual features are also possible.

The invention claimed is:

1. A hydrostatic piston engine unit comprising a housing in which a cylinder drum and a drive shaft are rotatably supported, wherein the cylinder drum is rotatably supported on the drive shaft and is capable of being connected to the drive shaft in a rotationally secure manner by means of a coupling.

2. The hydrostatic piston engine unit according to claim 1, wherein the coupling is arranged in the housing of the hydrostatic piston engine unit.

3. The hydrostatic piston engine unit according to claim 1, wherein the coupling is connected to the cylinder drum by means of a gear stage.

4. The hydrostatic piston engine unit according to claim 3, wherein the gear stage comprises a planetary gear.

5. The hydrostatic piston engine unit according to claim 4, wherein an internal gear wheel of the planetary gear is securely connected to the housing of the piston engine unit.

6. The hydrostatic piston engine unit according to claim 4, wherein the cylinder drum is connected to a web or a sun wheel of the planetary gear in order to produce a step-up or step-down operation.

7. The hydrostatic piston engine unit according to claim 1, wherein the coupling comprises a plate coupling.

8. The hydrostatic piston engine unit according to claim 7, wherein the plate coupling has a coupling cage and the coupling cage is connected to the drive shaft.

9. The hydrostatic piston engine unit according to claim 1, wherein the drive shaft is constructed as a through-shaft.

10. A hydrostatic piston engine unit comprising a housing in which a cylinder drum and a drive shaft are rotatably supported, wherein:
    the cylinder drum is capable of being connected to the drive shaft in a rotationally secure manner by means of a coupling, and
    the coupling comprises a plate coupling, wherein the plate coupling has a coupling cage connected to the drive shaft.

11. The hydrostatic piston engine unit according to claim 10, wherein the coupling is arranged in the housing of the hydrostatic piston engine unit.

12. The hydrostatic piston engine unit according to claim 10, wherein the coupling is connected to the cylinder drum by means of a gear stage.

13. The hydrostatic piston engine unit according to claim 12, wherein the gear stage comprises a planetary gear.

14. The hydrostatic piston engine unit according to claim 13, wherein an internal gear wheel of the planetary gear is securely connected to the housing of the piston engine unit.

15. The hydrostatic piston engine unit according to claim 13, wherein the cylinder drum is connected to a web or a sun wheel of the planetary gear in order to produce a step-up or step-down operation.

16. The hydrostatic piston engine unit according to claim 10, wherein the cylinder drum is rotatably supported on the drive shaft.

17. The hydrostatic piston engine unit according to claim 10, wherein the drive shaft is constructed as a through-shaft.

18. A hydrostatic piston engine unit comprising a housing in which a cylinder drum and a drive shaft being constructed as a through-shaft are rotatably supported, wherein:
    the cylinder drum is capable of being connected to the drive shaft in a rotationally secure manner by means of a coupling,
    the coupling comprises a plate coupling and is connected to the cylinder drum by means of a gear stage, and
    the gear stage is arranged in the force path direction between the coupling and the hydrostatic piston engine such that as long as a force path is not produced by means of the coupling, the drive shaft is capable of rotating independently of the gear stage.

19. The hydrostatic piston engine unit according to claim 18, wherein the coupling is arranged in the housing of the hydrostatic piston engine unit.

20. The hydrostatic piston engine unit according to claim 18, wherein the cylinder drum is rotatably supported on the drive shaft.

21. The hydrostatic piston engine unit according to claim 18, wherein the plate coupling has a coupling cage and the coupling cage is connected to the drive shaft.

22. A drive comprising a drive shaft which is arranged in a hydrostatic piston engine unit and at least a first store for storing pressure energy which is connected to the hydrostatic piston engine unit, wherein:
    the hydrostatic piston engine unit of the drive comprises a hydrostatic piston engine unit comprising a housing in which a cylinder drum and a drive shaft are rotatably supported, and
    the cylinder drum is rotatably supported on the drive shaft and is capable of being connected to the drive shaft in a rotationally secure manner by means of a coupling such that the hydrostatic piston engine unit is capable of being driven by the drive shaft means of the coupling.

23. The drive according to claim 22, wherein the drive comprises a vehicle drive and the drive shaft comprises a driven shaft of a drive motor.

24. The drive according to claim 22, wherein the drive comprises a vehicle drive and the drive shaft comprises a driven shaft of a vehicle gear.

25. The drive according to claim 22, wherein the drive comprises a hydrostatic gear.

26. The drive according to claim 22, wherein, in addition to the first store, the drive comprises a second store and the first and second stores are connected to each other by means of the hydrostatic piston engine unit.

27. The drive according to claim 22, wherein the at least one store can be separated from the hydrostatic piston engine unit by means of a blocking drive.

28. A drive comprising a drive shaft which is arranged in a hydrostatic piston engine unit and at least a first store for storing pressure energy which is connected to the hydrostatic piston engine unit, wherein:
    the hydrostatic piston engine unit of the drive comprises a hydrostatic piston engine unit comprising a housing in which a cylinder drum and a drive shaft are rotatably supported and the cylinder drum is capable of being connected to the drive shaft in a rotationally secure manner by means of a coupling, and
    the coupling comprises a plate coupling having a coupling cage connected to the drive shaft, and the hydrostatic piston engine unit is capable of being driven by the drive shaft means of the coupling.

29. The drive according to claim 28, wherein the drive comprises a vehicle drive and the drive shaft comprises a driven shaft of a drive motor.

30. The drive according to claim 28, wherein the drive comprises a vehicle drive and the drive shaft comprises a driven shaft of a vehicle gear.

31. The drive according to claim 28, wherein the drive comprises a hydrostatic gear.

32. The drive according to claim 28, wherein, in addition to the first store, the drive comprises a second store and the first and second stores are connected to each other by means of the hydrostatic piston engine unit.

33. The drive according to claim 28, wherein the at least one store can be separated from the hydrostatic piston engine unit by means of a blocking drive.

34. A drive comprising a drive shaft which is arranged in a hydrostatic piston engine unit and at least a first store for storing pressure energy which is connected to the hydrostatic piston engine unit, wherein:

the hydrostatic piston engine unit of the drive comprises a hydrostatic piston engine unit comprising a housing in which a cylinder drum and a drive shaft being constructed as a through-shaft are rotatably supported, the cylinder drum is capable of being connected to the drive shaft in a rotationally secure manner by means of a coupling, the coupling comprising a plate coupling and being connected to the cylinder drum by means of a gear stage, the gear stage is arranged in the force path direction between the coupling and the hydrostatic piston engine, such that as long as a force path is not produced by means of the coupling, the drive shaft is capable of rotating independently of the gear stage, and the hydrostatic piston engine unit is capable of being driven by the drive shaft by means of the coupling.

35. The drive according to claim 34, wherein the drive comprises a vehicle drive and the drive shaft comprises a driven shaft of a drive motor.

36. The drive according to claim 34, wherein the drive comprises a vehicle drive and the drive shaft comprises a driven shaft of a vehicle gear.

37. The drive according to claim 34, wherein the drive comprises a hydrostatic gear.

38. The drive according to claim 34, wherein, in addition to the first store, the drive comprises a second store and the first and second stores are connected to each other by means of the hydrostatic piston engine unit.

39. The drive according to claim 34, wherein the at least one store can be separated from the hydrostatic piston engine unit by means of a blocking drive.

* * * * *